Nov. 6, 1945.　　　H. H. HANSEN　　　2,388,407
TOOTHED CLUTCH MECHANISM
Filed Feb. 1, 1944　　　3 Sheets-Sheet 2
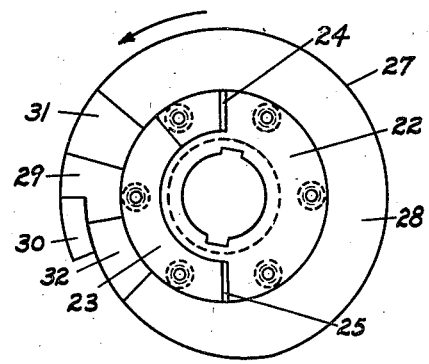
FIG.-5
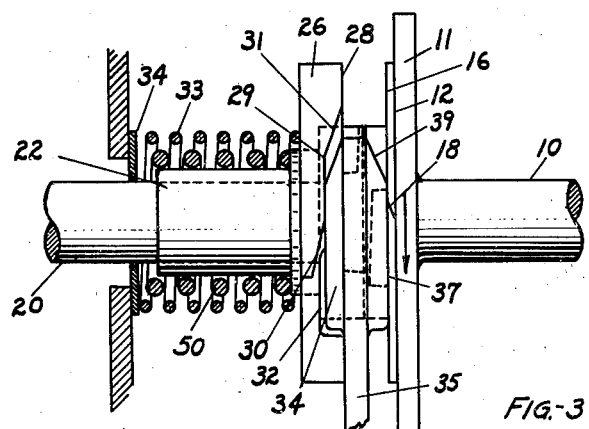
FIG.-3
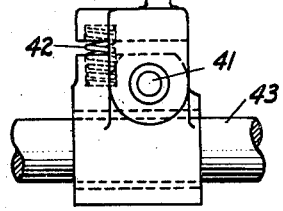
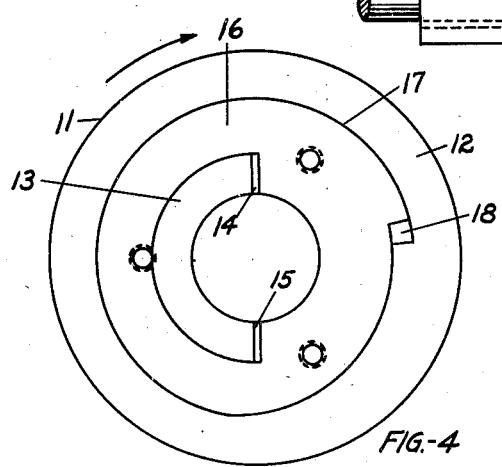
FIG.-4
Inventor
HANS H. HANSEN.
By Francis J. Klempay
Attorney Patented Nov. 6, 1945

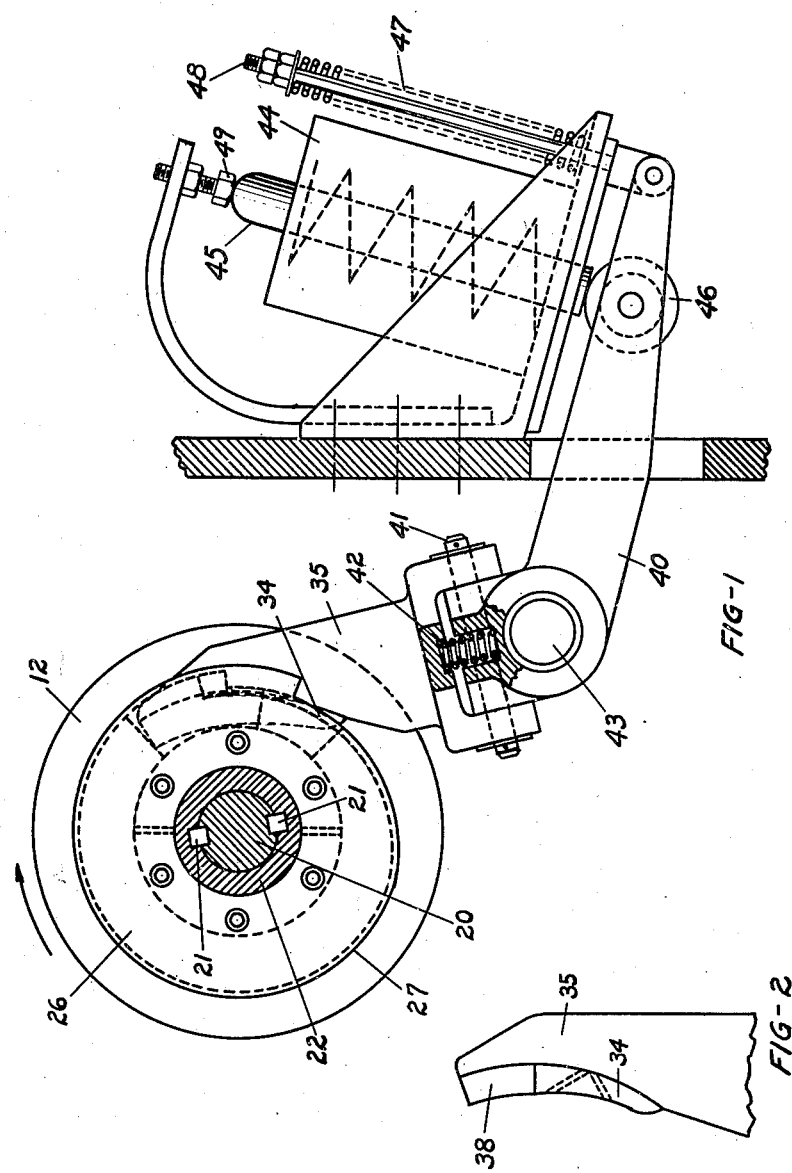

2,388,407

UNITED STATES PATENT OFFICE 2,388,407

TOOTHED CLUTCH MECHANISM

Hans H. Hansen, Warren, Ohio, assignor to The Taylor-Winfield Corporation, Warren, Ohio, a corporation of Ohio Application February 1, 1944, Serial No. 520,595

14 Claims. (Cl. 192—101)

This invention relates to a toothed clutch mechanism and more particularly to a mechanical clutch of the general type in which a declutching member is interposed between two rotating elements each connected with one of the two interlocking parts of the clutch for the purpose of separating the same thus disengaging the clutch and stopping relative rotation between the interlocking parts thereof.

The primary object of the invention is the provision of a clutch of the general type outlined which is operative to completely disengage the driven interlocking part of the clutch irrespective of the speed or variations in the speed of the mechanical drive which includes the clutch. Another object of the invention is the provision of a clutch of the general type outlined and having the operating characteristic stated which is simple in design, positive in action, and rugged and durable in use. The last named objects are accomplished by the invention by so constructing the disengaging members which are connected to the interlocking parts and the controlled intervening member in such manner that rotation of the driving shaft of the assembly results in complete disengagement of the interlocking clutch parts so that inertia of the driven parts of the clutch is not relied on, as heretofore, to effect complete disengagement of the interlocking parts of the clutch. By reason of this mode of operation the parts of the assembly are subjected to substantially less shock during normal operation and the clutch may be completely disengaged even when it is rotating at very slow or "inching" speeds. The apparatus of the invention is therefore of particular utility in the drive for the welding wheel of a roller spot welder since it is often desired that the wheel be driven at very low speeds although the invention is not to be considered as being limited to such use as other specific uses readily suggest themselves.

The above and other objects and advantages of the invention will become apparent upon consideration of the following detailed specification and the accompanying drawings wherein there is specifically disclosed a preferred embodiment of the invention.

In the drawings:

Figure 1 is an end elevation, partly in section, of an assembled clutch constructed in accordance with the principles of the invention;

Figure 2 is a fragmentary side view of a part of the assembly of Figure 1;

Figure 3 is a side view of a portion of the assembly of Figure 1, the view showing the clutch in disengaged position;

Figure 4 is a plan or face view of the driving assembly of the clutch of Figure 1;

Figure 5 is a plan or face view of the driven assembly of the clutch; and

Figure 6:
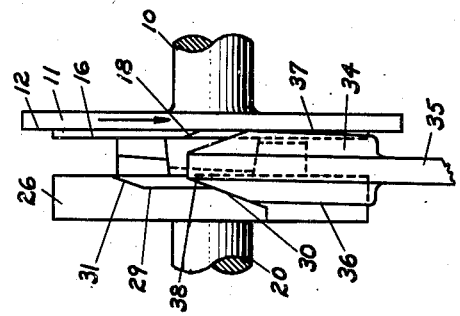
Figures 6, 7 and 8 are fragmentary side views of the driving and driven assemblies and the separating or declutching member, the view showing the assemblies in fully engaged, semi-engaged, and completely disengaged positions, respectively.

In the drawings, reference numeral 10 designates a driving shaft which is suitably journaled and held against axial movement in means not shown and suitably secured to the shaft 10 is a disk 11. The outer peripheral portion of the disk 11 is provided with a race 12 which lies in a plane normal to the axis of rotation of the shaft 10 and for a purpose to be later described is preferably polished. Concentrically spaced about said axis is an arcuate protuberance 13 the ends 14 and 15 of which form teeth or shoulders which are adapted to mesh or engage with the end surfaces of a similar protuberance on the driven assembly of the clutch to provide a positive driving interconnection through the clutch as will be understood. Radially inward of the race 12 the face of the disk 11 is raised to provide a second race 16 having an outer peripheral wall 17 which spirals inwardly as shown in Figure 4 to provide a radially extending offset. At the location of this offset there is an inclined surface 18 which extends from the plane of the race 12 to the plane of the race 16.

Reference numeral 20 designates the driven shaft of the assembly which shaft is suitably journaled in means not shown and feathered on the inner end of this shaft by means of the keys 21 is the driven gear 22. Referring to Figure 5 this driven gear comprises a concentrically disposed arcuately extending protuberance 23 having end teeth or shoulders 24 and 25 which are adapted to mesh or engage with the teeth 15 and 14, respectively, of the driving assembly of the clutch. Rigidly secured to gear 22 is a disk 26, the outer peripheral surface 27 of which spirals inwardly as shown in Figures 1 and 5 and this surface has generally the same peripheral contour as does the wall 17 intermediate the races 12 and 16 of the driving disk 11. For a purpose which will later become apparent the surfaces 17 and 27 are generally aligned in a circumferential relation with respect to each other when the teeth of the clutch are engaged.

The inner plane face 28 of the disk 26 is machined to provide an arcuately shaped flat surface 29 which is parallel with the face 28 but axially spaced therefrom. The face edge of the radially extending offset provided by the spiral nature of the outer peripheral surface 27 is removed to form a cam surface 30 which inclines toward the plane of the face 28, terminating at the flat surface 29. A cam surface 31 and a dwell 32 extend from the lagging and leading edges, respectively, of the surface 29 to the plane of the face 28 of the disk 26. It will be apparent from Figure 5 that all of the surfaces 28 through 32 are radially outside the gear 22.

The clutch described above is normally maintained in engaged position by a spring 33 which is interposed between the rear face of disk 26 and an abutment 34 which is axially fixed with respect to the shaft 20. Means now to be described is employed to move the disk 28 and the gear 22 connected therewith away from the disk 11 and against the expansion of the spring 33 to separate the clutch teeth thus disengaging the clutch. This means comprises a block 34 which is carried by an arm 35 and which is provided with an arcuate inner surface as shown in Figure 2. As viewed in Figures 3 and 6-8, block 34 projects on either side of the arm 35 to provide parallel side surfaces 36 and 37. At their upper or outer ends the side surfaces of the blocks 34 are cammed inwardly as shown at 38 and 39 at substantially the same pitch as the pitch of the inclined surfaces 31 and 18 previously described.

Arm 35 carrying the clutch disengaging block 34 is pivotally mounted on a lever 40 by means of the pivot pin 41 which allows movement of the block 34 through an arcuate path having a substantial component extending in a direction parallel with the axis of rotation of the clutch. An eccentrically positioned spring 42 urges the arm 35 to the right as viewed in Figure 3 so that during normal engaged operation of the clutch the right face 37 of the disengaging block 34 rides against the polished outer race 12 of the driving disk 11. Lever 40 is mounted for pivotal movement on a pin 43 which extends parallel with the axis of rotation of the clutch and to rock lever 40 about pivot 43 I provide a solenoid 44 having an armature 45 which engages a roller 46 journaled in or on the lever 40. During normal operation of the apparatus solenoid 44 is energized to hold arm 35 outwardly in which position the block 34 engages race 12 of disk 11 free of the cam surfaces 18, 30 and 31 thereby allowing the clutch to remain engaged. A spring 47 acting on lever 40 through pull rod 48 moves arm 35 and block 34 inwardly toward the axis of rotation of the clutch upon deenergization of the solenoid 44. The sequence of effect of the various elements of the clutch upon its disengagement will now be described.

Figure 7:
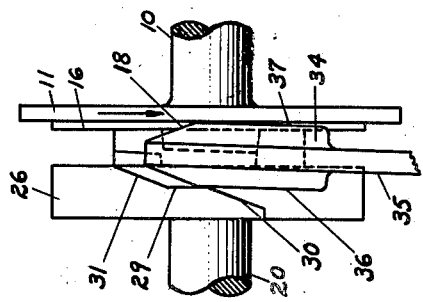
Figure 8:
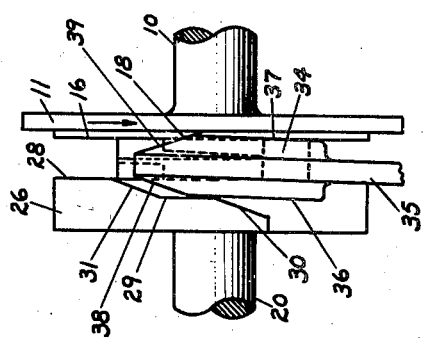

As explained above, solenoid 44 holds the block 34 radially outward of the outer peripheries of the disk 26 and the shoulder or wall 17. Upon de-energization of solenoid 44 the side portions of the curved inner surface 36 of the block 34 are brought into yielding engagement with the specifically mentioned peripheral surfaces and normally, of course, the engagement will take place at points circumferentially spaced from the radial offsets in these peripheral surfaces. Referring now to Figure 6, which shows the clutch in fully engaged condition, continued rotation of the interlocked disks 11 and 26 in the direction indicated will bring the surface 30 of the disk 26 into engagement with the surface 38 of the block 34 thereby moving disk 26 and its connected clutch gear axially away from the disk 11. However, the extent of such axial movement is insufficient to effect complete disengagement of the clutch gears so that disk 26 continues to be driven thereby insuring that the flat parallel surface 29 of the disk 26 will be brought up onto the flat parallel side surface 36 of the block 34, which relative positioning of the parts is illustrated in Figure 7. Continued rotation of the interlocked parts brings the cam surface 18 of the disk 11 into engagement with the surface 39 of the block 34 and because of the positive driven movement between the block and the disk 11 the block 34 will be forcibly moved to the left as viewed in Figure 8 thereby moving disk 26 and its connected clutch gear further to the left against the action of spring 33. When the race 16 of the disk 11 has moved up onto the parallel side surface 37 of the block 34 the disks 26 will have been moved far enough to the left to completely disengage the clutch teeth 14, 15 and 24, 25. At this time the restraint to radially inward movement applied to the block 34 by the peripheral wall 17 of the race 16 will have been removed and the block 34 can thereupon resume its radially inward movement under compulsion of spring 47 to an inner position determined by the setting of the screw adjustment 49 which acts through armature 45 as shown in Figure 1. Of course, the driving disk 11 continues to rotate but inasmuch as the surface 37 of block 34 is now opposite or rides on the polished race 16 of the disk 11 the parts are subjected to a minimum of shock and wear. To further resist wear surface 37 is preferably surfaced with suitable bearing metal and provided with oil grooves as indicated in Figure 2.

Upon the complete disengagement of the teeth of the clutch disk 26, gear 22, shaft 20 and connected parts will normally come to rest as the surface 31 of the former approaches or engages the surface 38 of the block 34. To prevent undue over-travel of these driven parts in case substantial inertia is inherent in them I provide a powerful coil spring 50 in parallel with the compression spring 33 but of such length, however, that it is not "broken" simply by axial movement of the disk 26 due to the cam surfaces 30 and 18. However, if disk 26 continues to rotate any appreciable amount after block 34 is free of the surface 18 surface 31 of disk 26 will ride up surface 38 of block 34 thereby moving disk 26 further to the left, as viewed in Figures 3 and 8, against the powerful force exerted by the heavy spring 50. This force, acting through surface 31, stops rotation of the driven members and upon dissipation of the inertia springs 33 and 50 initially and thereafter spring 33 causes surface 31 to slide off surface 38 thereby reducing the thrust between race 12 and surface 37 of block 34 to the constant value predetermined by the force of the spring 33.

It should be observed that during the process of disengagement and after the surface 18 has passed the surface 39 the left side portion of the block 34 can move radially inward by reason of the radial depth of the flat surface 29 and of the dwell 32. The surface 36 of the block 34 slides radially inward along the plane surface 29 while the opposite side surface 37 thereof slides radially inward along the plane surface of the race 16 as will be understood. To reengage the clutch solenoid 44 is reenergized which action withdraws the separating block 34 from the race 16 and from the flat surface 29, thereby enabling the spring 33 to move the disk 26 and the gear connected therewith toward the disk 11 to reestablish the driving interconnection between the protuberances or teeth 13 and 23.

While I have shown but a single protuberance on tooth on each of the interlocking parts of the clutch assembly it should be readily apparent that by duplicating certain of the surfaces of the rotating parts in circumferentially spaced relation a plural toothed clutch may be provided which may be more advantageous for certain purposes since declutching could then be effected in fractions of rather than only in full revolution increments of rotation of the parts.

It should now be apparent that I have provided an improved mechanical clutch of the toothed type which accomplishes the objects initially set out. By effecting separation of the toothed driving interconnection in two definite stages—first by action of a driven member and secondly by action of a driving member I am enabled to effect complete and positive separation of the interengaging parts without relying on the action of inertia of any of the parts or on the action of any spring devices as heretofore employed so that the clutch is completely operative in a uniform manner regardless of the speed of rotation of the parts thereof. None of the parts of the mechanism or any of the surfaces thereof are subjected to excessive impact or wear and, in operation, the mechanism has proven itself smooth and efficient.

The above specifically described embodiment of the invention should be considered as illustrative only as obviously many changes may be made therein without departing from the spirit or scope of the invention. Reference should therefore be had to the appended claims in determining the scope of the invention.

What I claim is:

1. A clutch mechanism comprising in combination a driving member having a toothed clutch part and a stepped involute face radially outward of said part, a driven member mounted for rotation about an axis coincident with the axis of rotation of said driving member and having a toothed clutch part adapted to be brought into and out of engagement with said first mentioned part longitudinally along said axis, means resiliently urging said driven member toward said driving member whereby said parts are normally interengaged, said driven member having an inner face radially outward of said second mentioned part, circumferentially spaced cam surfaces on said inner face, and a separating block mounted for movement toward said axis and between said faces as well as longitudinally along said axis; said block being operative to engage in succession one of the cam surfaces of said driven member to effect an initial but incomplete separation of said parts, the step in said involute face, to effect complete separation of said parts, and the second cam surface on said driven member to stop rotation of said driven member.

2. A device according to claim 1 further including additional means to resiliently urge said driven member toward said driving member, said additional means being operative to apply its force only upon interengagement of said block with said second cam surface.

3. A clutch mechanism comprising in combination a disk-like driving member having a driving element in its center portion and having on the radially outward portion of its inner face a race lying in the plane normal to its axis of rotation, said face having a raised portion intermediate said race and element, said raised portion having an involute outer periphery, an inclined surface extending from the plane of said race to the plane of said raised portion at the step of said periphery; a driven member mounted for rotation about said axis and having in its center portion a driven element adapted to coact with said driving element, said driven member being resiliently urged toward said driving member whereby said elements are normally interengaged, circumferentially spaced cam surfaces on the face of said driven member radially outward of said driven element; a separating block normally lying against said race and mounted for movement toward said axis as well as longitudinally along said axis, said block being operative to engage in succession one of the cam surfaces on said driven member to effect an initial but incomplete separation of said elements, said inclined surface thereby completing the separation of said elements, and the other of said cam surfaces to stop rotation of said driven member.

4. Apparatus according to claim 3 further characterized in that the outer peripheral surface of said driven member is involute, said first mentioned cam surface being located at the step of the peripheral surface of said driven member and circumferentially ahead of said inclined surface whereby said block may ride on the peripheral surface of said driven member subsequently engaging said first cam surface and thereafter said inclined surface.

5. Apparatus according to claim 3 further including additional means to resiliently urge said driven member toward said driving member, said additional means being operative to apply its force only upon the interengagement of said separating block with said second cam surface on said driven member.

6. In a clutch mechanism a disk-like driving member having a driving element in its center portion and a race on the outer portion of its inner face lying in a plane normal to its axis of rotation, said inner face having a raised portion intermediate said element and race; said raised portion having an involute outer periphery; an inclined surface interconnecting the planes of said race and raised portion at the step in said involute periphery, a driven member mounted for rotation about said axis and movable along said axis into and out of engagement with said element, a separating block mounted for movement toward and away from said axis as well as in a direction parallel with said axis, means normally holding said block in engagement with said race, and means to move said block toward said axis into engagement with said driven member and subsequently into engagement with said inclined surface to effect separation of said driving element and driven member after which said block rides on said raised surface.

7. Apparatus according to claim 6 further characterized in that the mounting means for said separating block comprises an arm carrying said block pivotally mounted in a support for rocking movement about an axis extending parallel with said planes whereby said block may have a component of movement extending substantially parallel with the axis of rotation of said driving member, means on said support to yieldably maintain said block in engagement with said race, and means mounting said support for rotation about an axis spaced from but substantially parallel with the axis of rotation of said driving member.

8. A clutch comprising in combination driving and driven members adapted to move toward and away from each other along their axis of rotation and having interengaging elements whereby the clutch may be alternately engaged and disengaged, yieldable means normally holding said members together with said elements interengaged, declutching cams on said members, and a declutching block adapted to be moved into engagement with said cams, said cams being circumferentially spaced whereby said cams are engaged in sequence to separate said members in a step by step manner.

9. A clutch comprising in combination driving and driven members adapted to have relative movement toward and away from each other along their axis of rotation and each having interengaging elements whereby the clutch may be alternately engaged and disengaged, yieldable means normally holding said members together with said elements interengaged, a pair of circumferentially spaced cams on the inner face of one of said members operative when engaged in sequence by a declutching block to initiate separation of said members and to stop rotation of the said one of said members, a declutching cam on the other of said members positioned circumferentially intermediate said first mentioned cams and operative to effect further and complete opening movement of said members when engaged by said block, a declutching block, and means to move said block radially inward toward said axis into position to be engaged by said cams in sequence.

10. Apparatus according to claim 9 further including means to apply an additional but stronger yielding closing force to certain of said members, said last mentioned means being operative only upon interengagement between said block and the lagging cam on said one of said members.

11. Apparatus according to claim 9 further characterized in that the said other of said members is a driving member of the clutch, and in that the inner face of the said other of said members of provided radially intermediate said elements and the cam on said other of said elements with a circumferentially extending race against which said block is adapted to bear following complete disengagement of the clutch.

12. A clutch comprising in combination disk-like driving and driven members adapted to have relative movement toward and away from each other along their axis of rotation and having interengaging elements whereby the clutch may be alternately engaged and disengaged, yieldable means normally holding said members together, the inner face of the driving member having an outer race and a raised inner race separated by an involute wall and an inclined surface interconnecting the inner and outer races at the step in said wall; said driven member having an involute periphery, an inclined surface on the inner face of said driven member commencing at the step of said periphery, a flat surface following said last mentioned inclined surface circumferentially, and a second inclined surface commencing at the circumferential end of said flat surface; said first mentioned inclined surface being spaced circumferentially intermediate said second mentioned inclined surfaces upon interengagement of said elements, and a declutching member adapted to be moved toward said axis to engage said inclined surfaces in succession upon rotation of the parts to effect intermittent declutching relative movement between said members.

13. A clutch comprising in combination interengaging driving and driven members having relative axial movement whereby the clutch may be alternately engaged and disengaged, means yieldingly retaining said members together, a declutching member adapted to be inserted between said members to move the same apart thus effecting disengagement therebetween, and circumferentially spaced cam surfaces on said members adapted to have successive engagement with said declutching member whereby the driven member is firmly held in an initial declutching position while the final declutching movement between the members is effected in a positive manner by continued rotation of the driving member.

14. Apparatus according to claim 13 further including a race on the inner face of the driving member radially inward of the cam surface thereon whereby continued movement of said declutching member toward said axis following completion of declutching movement between said members positions said declutching member in sliding contact with said race.

HANS H. HANSEN.